United States Patent Office 3,423,414
Patented Jan. 21, 1969

3,423,414
PYRAZOLOPYRIDINES
Herbert Morton Blatter, Irvington, N.J., assignor to Ciba Corporation, New York, N.Y., a corporation of Delaware
No Drawing. Filed Jan. 13, 1966, Ser. No. 521,241
U.S. Cl. 260—296
Int. Cl. C07d 57/04; A61k 25/00
7 Claims

ABSTRACT OF THE DISCLOSURE

Pyrazolo[3,4-c]pyridines, e.g. those of the formula

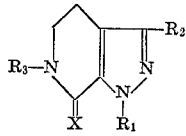

$R_{1,3}$=H, aliphatic or aromatic radical
$R_2$=amino, free, esterified or etherified OH or SH
X=$H_2$, alkyl$_2$, H+alkyl or O N-oxides, quaternaries and salts thereof exhibit anti-inflammatory effects.

---

The present invention concerns and has for its object the provision of bicyclic pyrazole compounds having the formulae

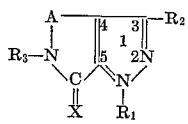

and

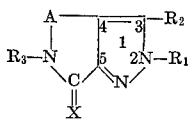

in which A stands for lower alkylene, alkanoylene or alkenylene separating the nitrogen atom from the 4-position by 2 or 3 ring-carbon atoms, each of $R_1$ and $R_3$ stands for hydrogen or an aliphatic or aromatic radical, $R_2$ for an amino group or a free, esterified or etherified hydroxy or mercapto group and X for two hydrogens or lower alkyls, hydrogen and lower alkyl or oxo, with the provision that in case A represents 1,2-ethylene, $R_1$ phenyl, $R_2$ hydroxy and X two hydrogen atoms, $R_3$ stands for an aromatic radical, N-oxides, quaternaries and salts of these compounds, as well as methods for their preparation.

A lower alkylene group A represents for example, 1,2-ethylene, 1,2- or 1,3-propylene, 1,2-, 1,3- or 2,3-butylene, 1,2-, 1,3-, 2,3- or 2,4-pentylene, 2,3-, 2,4- or 3,4-hexylene, 3,5-heptylene, 2-methyl-1,3-butylene, 2-methyl-2,3-propylene, 2,2-dimethyl-1,3-propylene or 3-ethyl-2,4-pentylene. Lower alkanoylene representing A is, for example, ethanoylene (—CO—CH$_2$—), 1,2- or 1,3-propanoylene, 1,2- or 1,3-butanoylene, 1,2- or 1,3-pentanoylene, 2-methyl-1,2-propanoylene, 2-methyl-1,3-butanoylene or 2-ethyl-1,3-propanoylene. Finally a lower alkenylene group A represents, for example, 1,2-ethenylene, 1-propenylene-(1,2) or -(1,3), 1-butenylene-(1,2) or -(1,3), 2-butenylene-(2,3), 2-pentenylene-(2,4) or 2-methyl-1-butenylene-(1,3). Said radicals may be connected to the nitrogen atom either by the frontal or terminal end of the chain.

An aliphatic radical representing $R_1$ and/or $R_3$ is, for example, alkyl, particularly lower alkyl, e.g. methyl, ethyl, n- or i-propyl, n- or i-butyl, n-pentyl, n-hexyl or n-heptyl, as well as higher alkyl, e.g. n-octyl, n-nonyl, n-decyl, n-undecyl or n-dodecyl, alkenyl, such as lower alkenyl, e.g. allyl, cycloalkyl or cycloalkyl-lower alkyl having from three to eight, preferably from five to six, ring-carbon atoms, e.g., cyclopropyl, cyclopentyl, cyclohexyl, or cycloheptyl, cyclopropyl-methyl, cyclopentyl-methyl, 3-cyclopentyl-propyl, cyclohexyl-methyl, 2-cyclohexyl-ethyl or cycloheptylmethyl, cycloalkenyl or cycloalkenyl-lower alkyl having from five to eight, preferably from five to six, ring-carbon atoms, e.g. 1-cyclopentenyl, 1-cyclohexenyl, 3-cyclohexenyl, 1-cycloheptenyl, 3-cycloheptenyl or 1-cyclooctenyl, 1-cyclopentenyl-methyl, 1-cyclohexenyl-methyl or 2-(3-cyclohexenyl)-ethyl, or an araliphatic group, particularly monocyclic carbocyclic aryl-lower alkyl, e.g. benzyl, 1- or 2-phenyl-ethyl or substituted phenyl-lower alkyl, as well as bicyclic carbocyclic aryl-lower alkyl, e.g. 1- or 2-naphthyl-methyl or substituted naphthyl-lower alkyl, monocyclic heterocyclic aryl-lower alkyl, especially monocyclic azacyclic aryl-lower alkyl, e.g. 2- or 4-pyridyl-methyl or substituted pyridyl-lower alkyl.

An aromatic radical representing $R_1$ and/or $R_3$ is, more especially, monocyclic or bicyclic carbocyclic or heterocyclic aryl, e.g. phenyl, substituted phenyl, naphthyl or substituted naphthyl; aza-, thia- or oxacyclic aryl, for example, pyridyl, e.g. 2- or 3- or 4-pyridyl or substituted pyridyl, thienyl, e.g. 2-thienyl or substituted thienyl, or furyl, e.g. 2-furyl or substituted furyl.

The above radicals representing $R_1$ and/or $R_3$ may have one or more than one of the same or of different substituents attached to any of the positions available for substitution. Such substituents are, for example, lower alkyl, e.g. that mentioned above, hydroxy, etherified hydroxy, especially lower alkoxy, e.g. methoxy, ethoxy, n- or i-propoxy or n-butoxy, esterified hydroxy, especially halogeno, e.g. fluoro, chloro or bromo, trifluoromethyl, etherified mercapto, especially lower alkylmercapto, e.g. methylmercapto or ethylmercapto, amino, such as tertiary amino, for example, di-lower alkylamino, e.g. dimethylamino or diethylamino, alkyleneimino aza-, oxa- or thiaalkyleneimino containing from four to seven ring-carbon atoms, e.g. pyrrolidino, piperidino, 1,6-hexyleneimino, piperazino, 4-methyl-piperazino, morpholino or thiamorpholino, carboxy or carbo-lower alkoxy, e.g. carbomethoxy or carbethoxy.

Substituted aliphatic or aromatic radicals representing $R_1$ and/or $R_3$ are, more especially, hydroxy-lower alkyl, lower alkoxy-lower alkyl, di-lower alkylamino-lower alkyl, or alkyleneimino-lower alkyl containing from four to seven ring-carbon atoms; in these groups the substituent is separated from the nitrogen carrying $R_1$ or $R_3$ by at least two carbon atoms. Furthermore (lower alkyl)-phenyl-lower alkyl, (lower alkoxy)-phenyl-lower alkyl, (halogeno)-phenyl-lower alkyl, (trifluoromethyl)-phenyl-lower alkyl, (lower alkylmercapto)-phenyl-lower alkyl or (di-lower alkylamino)-phenyl-lower alkyl, but preferably (lower alkyl)-phenyl, (lower alkoxy)-phenyl, (halogeno)-phenyl, (trifluoromethyl)-phenyl, (lower alkylmercapto)-phenyl or (di-lower alkylamino)-phenyl, as well as (lower alkyl)-pyridyl.

The radical $R_2$ more particularly stands for primary, secondary or tertiary amino, the latter two contain radicals mentioned for $R_1$, but being preferably one of the tertiary amino groups mentioned above, for hydroxy, halogeno, e.g. fluoro, chloro or bromo, lower alkoxy or alkylmercapto, e.g. that mentioned above, acylamino or esterified hydroxy containing the acyl radical of a carboxylic acid, for example, of those acids mentioned for the salts below.

The quaternaries of the invention are more particularly those containing an additional lower alkyl or aryl-lower alkyl group, e.g. that mentioned above, on preferably one of the nitrogen atoms present.

The compounds of this invention possess valuable pharmacological properties. They show primarily anti-inflammatory activity, as can be demonstrated in animal tests using, for example mice, rats and dogs as test objects. They are, therefore, primarily useful as anti-inflammatory agents, for example in place of corticosteroids, e.g. cortisone or hydrocortisone, in the treatment of tissue inflammations, such as arthritic inflammations. Furthermore, they are useful starting materials or intermediates in the manufacture of other valuable products, preferably pharmacologically active compounds.

Particularly useful are compounds of the above formulae in which A stands for lower alkylene or alkanoylene separating the nitrogen atom from the 4-position by two-ring carbon atoms, $R_1$ for hydrogen, lower alkyl, cycloalkyl or cycloalkyl-lower alkyl having from five to six ring-carbon atoms, monocyclic carbocyclic aryl-lower alkyl, monocyclic carbocyclic aryl or monocyclic azacyclic aryl, $R_2$ for amino, mono- or di-lower alkylamino, alkyleneimino aza-, oxa- or thiaalkyleneimino containing from four to seven ring-carbon atoms, hydroxy, lower alkoxy or alkylmercapto, acylamino or acyloxy derived from a lower aliphatic carboxylic acid, $R_3$ for monocyclic carbocyclic aryl or monocyclic azacyclic aryl and X for hydrogen or oxo, N-oxides and quaternary lower alkyl ammonium derivatives thereof and salts of these compounds.

Compounds that are especially valuable are those of the formulae

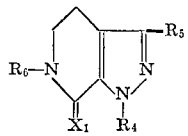

and

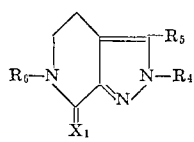

in which $X_1$ stands for hydrogen or oxo, $R_4$ for hydrogen, lower alkyl, phenyl, (lower alkyl)-phenyl, (lower alkoxy)-phenyl, (halogeno)-phenyl, (trifluoromethyl)-phenyl, $R_5$ for mono- or dilower alkylamino, alkyleneimino, aza-, oxa- or thiaalkyleneimino containing from four to seven ring-carbon atoms, hydroxy or lower alkoxy and $R_6$ for phenyl, (lower alkyl)-phenyl, (lower alkoxy)-phenyl, (halogeno)-phenyl, or (trifluoromethyl)-phenyl, and acid addition salts thereof.

The compounds of the present invention are prepared according to methods in themselves known. For example the process for their preparation consists in:

(a) reacting a compound of the formula

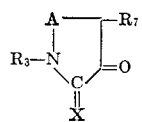

in which $R_7$ stands for a free or functionally converted carboxy or thiocarboxy group, with the hydrazine $R_1$—NH—NH$_2$ or (b) reacting compounds of the formulae

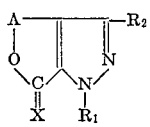

and

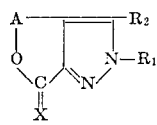

of which the ring-oxygen atom is connected with at least one carbonyl group, with the compound $R_3$—NH$_2$ or (c) condensing compounds of the formulae

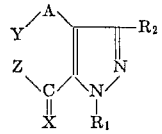

and

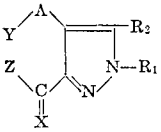

in which Y and Z are residues that react together to form an $R_3$-amino bridge by cyclization or (d) treating the oxime of the ketones having the formulae

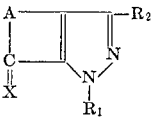

and

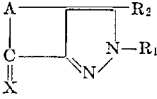

and containing only one carbonyl group either connected to the 5-position or being separated therefrom by one ring-carbon atom, or a sulfonic acid ester thereof, with a Beckmann rearrangement catalyst or (e) treating compounds of the formulae

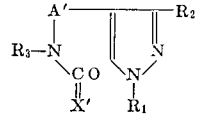

and

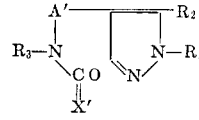

in which A' stands for alkylene and X' for hydrogen or lower alkyl, with a condensing agent and hydrogenating the condensation product or (f) treating compounds of the formulae

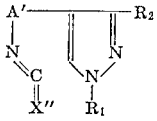

and

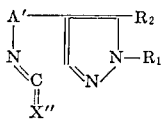

in which X'' stands for two lower alkyls or hydrogen and lower alkyl, or an aliphatic quaternary ammonium derivative thereof, with an acidic agent and, if desired, converting any product obtained into another disclosed compound.

In the starting material mentioned under item (a) a functionally converted carboxy or thiocarboxy group $R_7$ preferably stands for the groups —CO—$R_2$ or —CN.

The starting materials to be used in the intramolecular condensation (c) are advantageously selected so that one of the residues Y and Z is an at most $R_3$-monosubstituted amino group and the other is a free or reactively modified hydroxy group. The latter is above all a reactively esterified hydroxy group, for example such esterified with a strong inorganic acid, such as a hydrohalic acid, e.g. hydrochloric, hydrobromic or hydriodic acid, or a sulfonic acid, such as an alkane or benzene sulfonic acid, e.g. methane, ethane or p-toluene sulfonic acid.

A Beckmann rearrangement catalyst preferably is an acidic agent, for example a strong inorganic or organic acid or a halide thereof, such as hydrochloric, sulfuric, phosphoric or p-toluene sulfonic acid, boron trifluoride, phosphorus pentachloride or benzenesulfonylchloride.

The condensing agent used in reaction (e) more especially is a hygroscopic agent commonly used in the Bischler-Napieralski synthesis, such as phosphorus pentoxide or phosphorus oxychloride. The following hydrogenation is carried out, for example with catalytically activated hydrogen, e.g. hydrogen in the presence of a palladium or nickel catalyst.

The acidic agent used in reaction (f) more especially is that used in the Pictet-Spengler synthesis such as a hydrohalic acid, e.g. hydrochloric acid, or may also be released from a salt.

The final products of this invention may be converted into each other by methods in themselves known. Thus, a resulting carbonyl compound can be reduced, for example, with a complex light metal hydride, such as an alkali metal aluminum hydride, e.g. lithium aluminum hydride, and/or in a resulting A-unsaturated compound the double bond may be saturated, for example as shown above. In a resulting compound having a hydrogen atom on a nitrogen, oxygen or sulfur atom, the hydrogen can be replaced by corresponding radicals, for example by reaction with a carboxylic acid ester or halide or a reactive ester of an aliphatic alcohol, particularly such formed with a strong inorganic acid or organic sulfonic acid, e.g. those mentioned above. Suitable reactive esters are, for example, lower alkyl halides, monocyclic carbocyclic aryl-lower alkyl halides, di-lower alkyl sulfates, lower alkyl lower alkane sulfonates or lower alkyl benzene sulfonates. This reaction is preferably carried out with the starting material present in the form of a metal compound, particularly of an alkali metal, e.g. lithium or sodium salt. The latter is prepared by treating the resulting compound with a suitable metal salt-forming reagent, for example, with an alkali metal hydride e.g. sodium or potassium hydride. A methyl group may also be attached to a nitrogen atom by treating the N-unsubstituted compound with formaldehyde in the presence of a reducing reagent, e.g. formic acid, or in the presence of hydrogen and a hydrogenation catalyst, e.g. palladium. The introduction of an aromatic radical may be achieved with the use of an aryldiazonium salt, such as a benzene-diazonium halide, e.g. benzene-, p-toluene- or 4-fluoro-benzene-diazonium chloride or bromide, or via an arine, i.e. reacting a compound generating it, such as 1-chloro-2-bromo-benzene, with lithium.

N-oxides of the compounds of the present invention are formed for example, by reaction with an N-oxidizing reagent, such as hydrogen peroxide, ozone, persulfuric acid, or more especially a percarboxylic or sulfonic acid, e.g. peracetic, perbenzoic, monoperphthalic or p-toluene persulfonic acid. In this reaction, an excess of the oxidation reagent and/or an increase in temperature should be avoided in order to prevent oxidative degradation.

Quaternary ammonium derivatives are prepared, for example, by treating the free compounds with a reactive ester of an alcohol, preferably of an aliphatic alcohol with especially a strong acid, such as one of the previously-mentioned esters. A resulting quaternary ammonium derivative may be converted into another quaternary ammonium compound, such as the hydroxide. The latter is, for example, obtained by reacting a quaternary ammonium halide with silver oxide, or a quaternary ammonium sulfate with barium hydroxide or by treating a quaternary ammonium salt with a hydroxyl ion exchange preparation or by electrodialysis.

The final products are obtained in the free form or in the form of their salts, depending on the conditions under which the process is carried out; the salts are also included in the present invention. Salts that are obtained can be converted into the free bases for example, by reacting them with a basic reagent, such as a metal hydroxide, e.g. sodium, potassium or calcium hydroxide, an alkali metal carbonate, e.g. sodium or potassium carbonate or hydrogen carbonate, ammonia or a hydroxyl ion exchange preparation.

A resulting salt may also be converted into another salt, for example by its treatment with a suitable anion exchange preparation. Furthermore, a salt with an inorganic acid may be reacted with a metal, e.g. sodium, barium or silver salt of an acid in a suitable diluent in which a resulting inorganic compound is insoluble and is thus removed from the reaction medium.

A free base is converted into a salt thereof, by its treatment with an acid or an anion exchange preparation. Preferred salts are those of therapeutically useful acids, such as inorganic acids, e.g. hydrochloric, hydrobromic, nitric, sulfuric or phosphoric acid or organic acids, such as carboxylic or sulfonic acids, e.g. acetic, propionic, glycolic, malonic, succinic, maleic, hydroxymaleic, fumaric, malic, tartaric, citric, glucuronic, benzoic, salicylic, 4-aminosalicylic, 2-acetoxybenzoic, pamoic, nicotinic, isonicotinic, methane sulfonic, ethane sulfonic, ethane 1,2-disulfonic, 2-hydroxyethane sulfonic, benzene sulfonic, toluene sulfonic or naphthalene 2-sulfonic acid. Other acid addition salts are useful as intermediates for the preparation of the pure parent compounds or in the manufacture of other salts, as well as for identification or characterization purposes. Addition salts primarily used for the latter are, for example, those with certain inorganic acids, e.g. perchloric, phosphotungstic, phosphomolybdic, chloroplatinic or Reinecke acid or with acidic organic nitro compounds, e.g. picric, picrolonic or flavianic acid. The bases are converted into salts, the salts are separated and the bases liberated from the salts. In view of the close relationship between the free compounds and the compounds in the form of their salts, whenever a free base is referred to in this context, a corresponding salt is also intended, provided such is possible and useful.

Resulting mixtures of isomeric compounds may be separated into single isomers based, for example, on physicochemical differences, such as different solubilities or different boiling points. Thus, mixtures of isomers or racemates may be separated by fractional crystallization or fractional distillation, if necessary, by using a derivative thereof, e.g. a salt. Racemic products can likewise be resolved into the optical antipodes, for example, by reaction with optically active acids, separation of the diastereomeric salts and liberation of the bases from the salts.

The above mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention further includes any variant of the present process in which an intermediate product obtainable at any stage thereof is used as starting material and any remaining step or steps is/are carried out or the process is discontinued at any stage thereof or in which the starting materials are formed in situ or the reactants are used in the form of their salts. The present reactions are preferably performed with starting materials that give rise to the preferred compounds mentioned above.

The present invention also comprises any new starting material disclosed above, especially that mentioned under (a), (b), and (d). The compounds shown under item (a) can be obtained, for example, by treatment of a compound having the formula

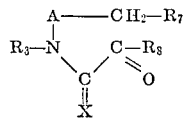

in which $R_8$ stands for etherified hydroxy, especially lower alkoxy, with a basic condensing agent, for example an alkali metal alcoholate, e.g. sodium or potassium methoxide, ethoxide, n-butoxide or tert. butoxide. The above starting material in turn may be obtained from the amine $R_3$—NH—A—$CH_2$—CO—$R_2$ by reaction with an oxalic diester or ester halide or an $\alpha$-monohalo-alkanoic acid ester.

The compounds shown under item (b) may be obtained by reacting the corresponding lactones or cyclic anhydrides of the formula

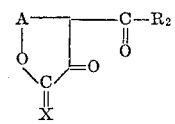

with the hydrazine $R_1$—NH—$NH_2$ analogous to reaction (a) or by dehydrating the corresponding 4-(hydroxy- or carboxy-lower alkyl)-pyrazole-5-carboxylic acids or 4-(carboxy-lower alkyl)-5-hydroxy-methyl-pyrazoles, if necessary via the corresponding acid halides. The latter compounds may also serve as intermediates for the starting material mentioned under item (c), for example, by reactively esterifying the hydroxy-alkyl group and reacting the halide obtained with the amine $R_3$—$NH_2$; if desired any free carboxy group can be esterified previously, the amine-ester obtained saponified and the acid converted into its halide according to known methods. On the other hand, a carboxyl group in said starting material may first be converted into the carbamyl group $R_3NHCO$— and hereupon the free hydroxy group reactively esterified.

The starting material mentioned under item (d) can be obtained from the corresponding ketones by reaction with hydroxyl amine; the ketones themselves are obtained analogous to process (a) if necessary using compounds with suitable protected, e.g. ketalized, oxo groups.

The starting material shown under item (e) can be prepared from the corresponding 4-$R_3$-amino-lower alkyl-pyrazoles by reaction with a lower alkanoyl halide and that mentioned under item (f) by condensation of said amines with a lower alkanal or alkanone.

The pharmacologically active compounds of this invention are useful in the form of compositions for enteral, e.g. oral, or parenteral use, which contain a pharmacologically effective amount of the active compound of this invention in admixture with a pharmaceutically acceptable organic or inorganic, solid or liquid carrier. For making up the latter, there are employed the usual carrier materials suitable for the manufacture of pharmaceutical compositions, such as water, gelatine, sugars, e.g. lactose, sucrose or glucose, starches, e.g. corn, wheat or rice starch, stearic acid or salts thereof, e.g. magnesium or calcium stearate, talc, vegetable oils, alcohols, e.g. ethanol, stearyl alcohol or benzyl alcohol, gums, acacia, tragacanth, propylene glycol or polyalkylene glycols or any other suitable excipient or mixtures thereof. The compositions may be in solid form, e.g. capsules, tablets, dragees or suppositories, or in liquid form, e.g. solutions, suspensions or emulsions. If desired, they may contain auxiliary substances, such as preserving, stabilizing, wetting, emulsifying, coloring or flavoring agents, salts for varying the osmotic pressure and/or buffers. The above preparations are prepared according to the standard methods used for the manufacture of pharmaceutically acceptable compositions, which, if desired, may also contain, in combination, other physiologically useful substances.

The following examples are intended to illustrate the invention and are not to be construed as being limitations thereon. Temperatures are given in degrees centigrade and all parts wherever given are parts by weight.

Example 1

To the solution of 1.38 g. ethyl 1-(4-methyl-phenyl)-2,3-dioxo-hexahydro-isonicotinate in 30 ml. ethanol, the solution of 0.7 g. 4-fluoro-phenylhydrazine hydrochloride in 10 ml. ethanol and that of 0.15 g. sodium methylate in 10 ml. ethanol are added and the mixture is refluxed for 20 hours. It is then evaporated in vacuo, the residue triturated with methylene chloride, the solution filtered, the filtrate dried and evaporated. The residue crystallizes upon addition of diethylether and is recrystallized from acetone-hexane to yield the 1-(4-fluoro-phenyl)-3-hydroxy-6-(4-methyl-phenyl)-7-oxo-4,5,6,7-tetrahydro-1H-pyrazolo[3,4-c]-pyridine of the formula

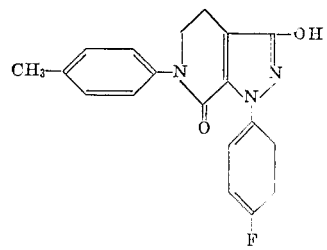

melting at 190–192°.

The starting material is prepared as follows:

The mixture of 9.75 g. ethyl $\gamma$-bromo-butyrate, 10.7 g. p-toluidine and 6.9 g. potassium carbonate is warmed up to cause the p-toluidine to melt and is stirred at room temperature for 24 hours and at 100° for 5½ hours. After cooling water is added to the mixture which is then extracted with methylene chloride. The extract is washed with diluted hydrochloric acid and water dried and evaporated to yield the ethyl $\gamma$-(4-methylphenylamino)-butyrate as an oil.

To a solution of 28.0 g. thereof in 200 ml. benzene, 254 ml. 1 N sodium hydroxide are added and hereupon dropwise with stirring the solution of 25.9 g. ethyl oxalyl chloride and 50 ml. benzene. The reaction mixture is stirred at room temperature for 1½ hours, then the two layers separated and the aqueous solution extracted with benzene. The organic solutions are dried, evaporated in vacuo and the residue dissolved in 300 ml. ethanol. To the solution 6.85 g. sodium methylate in 50 ml. ethanol are added and the mixture is refluxed for 3 hours. It is then concentrated, mixed with water, filtered and the residue washed with water. The filtrate is acidified with diluted hydrochloric acid, the precipitate filtered off and recrystallized from diethyl ether to yield the ethyl 1-(4-methyl-phenyl)-2,3-dioxo-hexahydro-isonicotinate melting at 105–108°.

Example 2

To the solution of 2.28 g. 1-(4-methyl-phenyl)-2,6-dioxo-hexahydro-isonicotinonitrile in 50 ml. ethanol, 0.37 g. 95% anhydrous hydrazine are added and the mixture is stirred and refluxed for 20 hours. The solid formed is filtered off and recrystallized from dimethylsulfoxide-ethanol to yield the 3-amino-6-(4-methyl-phenyl)-7-oxo- 4,5,6,7 - tetrahydro - 1H - pyrazolo[3,4-c]pyridine of the formula

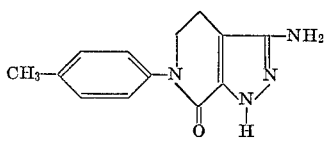

melting above 310°.

The starting material is prepared as follows:

To the solution of 1.74 g. γ-(4-methyl-phenyl)-butyronitrile in 25 ml. ethanol 1.46 g. diethyl oxalate and hereupon 0.54 g. sodium methylate in 5 ml. ethanol are added and the mixture is refluxed for one hour. It is concentrated in vacuo, the residue taken up in water, the mixture filtered, the filtrate acidified with diluted hydrochloric acid and the precipitate formed filtered off. It is dried and recrystallized from acetone-hexane to yield the 1-(4-methyl-phenyl) - 2,3 - dioxo-hexahydro-isonicotinonitrile melting at 187–189°.

Example 3

To the solution of 0.456 g. 1-(4-methyl-phenyl)-2,3-dioxo-hexahydro-isonicotinonitrile in 15 ml. ethanol, the suspension of 0.358 g. 4-fluoro-phenylhydrazine hydrochloride in 10 ml. ethanol and thereafter the solution of 0.06 g. sodium methylate in 5 ml. ethanol are added while stirring and the mixture is refluxed for 20 hours and allowed to stand at room temperature for 24 hours. It is filtered, the residue washed with water and recrystallized from dimethylformamide-ethanol to yield the 1-(6-fluorophenyl) - 3 - amino - 6 - (4-methyl-phenyl)-7-oxo-4,5,6,7-tetrahydro-1H-pyrazolo[3,4-c]pyridine of the formula

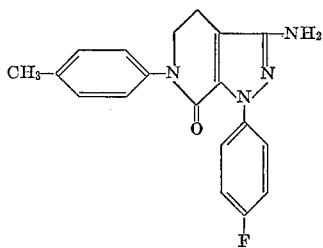

melting at 298–302°.

Example 4

The mixture of 0.5 g. 3-amino-6-(4-methyl-phenyl)-7-oxo - 4,5,6,7 - tetrahydro - 1H - pyrazolo[3,4-c]pyridine and 7.5 ml. ethyl acetoacetate is heated to about 150° until a clear solution is formed. It is cooled, evaporated in vacuo. The residue is suspended in diethyl ether, filtered and recrystallized from acetone-hexane with the use of charcoal to yield the 3-acetoacetylamino-6-(4-methylphenyl) - 7 - oxo - 4,5,6,7-tetrahydro-1H-pyrazolo[3,4-c]pyridine of the formula

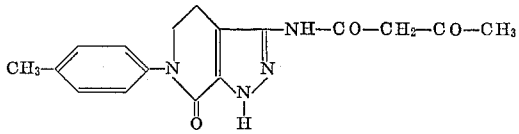

melting at 225–227°.

Example 5

The mixture of 0.5 g. 1-(4-fluoro-phenyl)-3-amino-6-(4 - methyl-phenyl) - 7 - oxo-4,5,6,7-tetrahydro-1H-pyrazolo[3,4-c]pyridine and 0.75 g. ethyl acetoacetate is heated to about 150° for 15 minutes and allowed to cool for one hour. It is extracted 2 times with boiling ethanol, the extract concentrated and upon cooling the 1-(4-fluorophenyl) - 3 - acetoacetylamino-6-(4-methyl-phenyl)-7-oxo-4,5,6,7-tetrahydro-1H-pyrazolo[3,4-c]pyridine of the formula

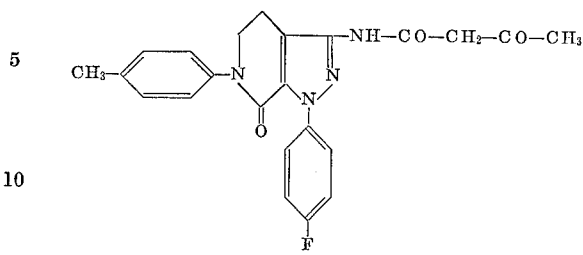

separates, which melts at 184–187° after recrystallization from ethanol.

Example 6

To the suspension of 0.15 g. of a 53% suspension or sodium hydride in mineral oil, 12.5 ml. dimethylformamide and 12.5 ml. toluene, kept under nitrogen, 1.01 g. 1 - (4-fluoro-phenyl)-3-amino-6-(4-methyl-phenyl)-7-oxo-4,5,6,7-tetrahydro-1H-pyrazolo [3,4-c] pyridine are added portionwise. Hereupon the reaction mixture is refluxed for 15 minutes, cooled and mixed slowly with 1.75 ml. 2-diethylamino-ethyl chloride and refluxing is resumed for 2 hours. After cooling 5 ml. ethanol are added, the mixture is concentrated in vacuo, the residue mixed with water, extracted with methylene chloride and the extract evaporated. The residue is taken up in diethyl ether, the solution decolorized with charcoal and concentrated. Upon cooling a precipitate separates which is recrystallized from acetone-hexane to yield the 1 - (4 - fluorophenyl) - 3 - (2 - diethylamino-ethylamino)-6-(4-methylphenyl) - 7 - oxo-4,5,6,7-tetrahydro-1H-pyrazolo [3,4-c] pyridine of the formula

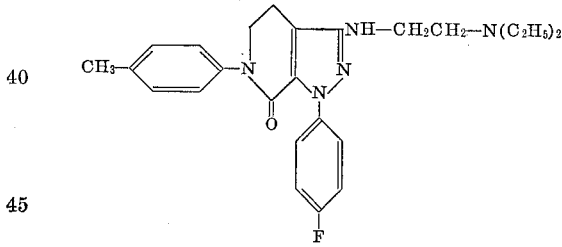

melting at 170–172°.

Example 7

According to the methods described in the previous examples, the following compounds are prepared by selecting equivalent amounts of the appropriate starting materials:

1 - cyclohexyl - 3 - hydroxy - 6-phenyl-7-oxo-4,5,6,7-tetrahydro-1H-pyrazolo[3,4-c]pyridine, 1 - cyclopentylmethyl - 3 - amino - 6-(4-chloro-phenyl)-7-oxo-4,5,6,7-tetrahydro-1H-pyrazolo[3,4-c]pyridine, 1 - benzyl - 3 - (4 - methyl - piperazino)-6-methyl-7-oxo-4,5,6,7-tetrahydro-1H-pyrazolo[3,4-c]pyridine, 1 - (4 - methoxy - phenyl) - 3 - hydroxy-6-(3,4-dichlorophenyl) - 7-oxo-4,5,6,7-tetrahydro-1H-pyrazolo[3,4-c]pyridine, 1 - (4 - trifluoromethyl - phenyl)-3-amino-6-(4-methoxyphenyl) - 7-oxo-4,5,6,7-tetrahydro-1H-pyrazolo[3,4-c]pyridine, 1 - (2 - pyridyl) - 3 - benzylamino-6-(4-bromo-phenyl)-7-oxo-4,5,6,7-tetrahydro-1H-pyrazolo[3,4-c]pyridine, 1 - (4 - methyl-phenyl)-3-acetylamino-5-methyl-6-phenyl-7-oxo-4,5,6,7-tetrahydro-1H-pyrazolo[3,4-c]pyridine, 1 - (4 - methyl-phenyl)-3-(2-dimethylamino-ethylamino)-6 - methyl-7-oxo-4,5,6,7-tetrahydro-1H-pyrazolo[3,4-c]pyridine, 1 - cyclohexyl - 3 - (2-methoxy-ethylamino)-6-phenyl-7-oxo-4,5,6,7-tetrahydro-1H-pyrazolo[3,4-c]pyridine, 1 - allyl - 3-hydroxy-6-(4-methylmercapto-phenyl)-7-oxo-4,5,6,7-tetrahydro-1H-pyrazolo[3,4-c]pyridine, 1 - (4-fluoro-phenyl)-3-morpholino-6-(4-methyl-phenyl)-7-oxo-4,5,6,7-tetrahydro-1H-pyrazolo[3,4-c]pyridine, 1 - (4 - fluoro - phenyl)-3-cyclopentylmethylamino-6-(4-methyl-phenyl)-7-oxo-4,5,6,7-tetrahydro - 1H - pyrazolo [3,4-c]pyridine and 1 - (4-fluoro-phenyl)-3-methylamino-6-(4-methyl-phenyl)-7-oxo-4,5,6,7-tetrahydro-1H-pyrazolo[3,4-c]pyridine.

What is claimed is:

1. A member selected from the group consisting of compounds having the formula

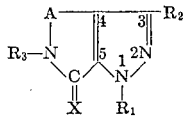

in which A stands for a member selected from the group consisting of 1,2-ethylene and 1,2-propylene, each of $R_1$ and $R_3$ stands for a member selected from the group consisting of lower alkyl, cycloalkyl and cycloalkyl-lower alkyl having from five to six ring-carbon atoms, R-phenyl-lower alkyl, R-phenyl and pyridyl, wherein R represents a member selected from the group consisting of hydrogen, lower alkyl, lower alkoxy, halogeno and trifluoromethyl, $R_1$ also for hydrogen, $R_2$ for a member selected from the group consisting of amino, lower alkylamino, cycloalkylamino and cycloalkyl-lower alkylamino having from five to six ring-carbon atoms, R-phenyl-lower alkylamino, R-phenylamino, di-lower alkylamino, 4-methyl-piperazino, morpholino, hydroxy, lower alkoxy and lower alkanoyloxy, and X for a member selected from the group consisting of two hydrogen atoms, two lower alkyls, hydrogen and lower alkyl, and oxo, with the provision that in case A represents 1,2-ethylene, $R_1$ phenyl, $R_2$ hydroxy and X two hydrogen atoms, $R_3$ stands for R-phenyl, an N-oxide, a lower alkyl quaternary ammonium salt and a therapeutically useful acid addition salt thereof.

2. A compound as claimed in claim 1, in which formula A stands for 1,2-ethylene, $R_1$ for a member selected from the group consisting of hydrogen, lower alkyl, cycloalkyl and cycloalkyl-lower alkyl having from five to six ring-carbon atoms, R-phenyl-lower alkyl, R-phenyl and pyridyl, wherein R represents a member selected from the group consisting of hydrogen, lower alkyl, lower alkoxy, halogeno and trifluoromethyl, $R_2$ for a member selected from the group consisting of amino, lower alkylamino, di-lower alkylamino, 4-methyl-piperazino, morpholino, hydroxy, lower alkoxy and lower alkanyloxy, $R_2$ for a member selected from the group consisting of R-phenyl and pyridyl and X for a member selected from the group consisting of two hydrogen atoms and oxo, a quaternary lower alkyl ammonium salt and a therapeutically useful acid addition salt thereof.

3. A compound as claimed in claim 1 and having the formula

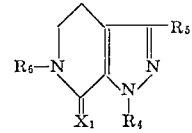

in which $X_1$ stands for a member selected from the group consisting of two hydrogen atoms and oxo, $R_4$ for a member selected from the group consisting of hydrogen, lower alkyl, phenyl, (lower alkyl)-phenyl, (lower alkoxy)-phenyl, (halogeno)-phenyl and (trifluoromethyl)-phenyl, $R_5$ for a member selected from the group consisting of lower alkylamino, di-lower alkylamino, 4-methyl-piperazino, morpholino, hydroxy and lower alkoxy and $R_6$ for a member selected from the group consisting of phenyl, (lower alkyl)-phenyl, (lower alkoxy)-phenyl, (halogeno)-phenyl and (trifluoromethyl)-phenyl, and a therapeutically useful acid addition salt thereof.

4. 1-(4-fluoro-phenyl)-3-hydroxy-6-(4-methyl-phenyl)-7-oxo-4,5,6,7-tetrahydro-1H-pyrazolo[3,4-c]pyridine.

5. 3 - amino - 6-(4-methyl-phenyl)-7-oxo-4,5,6,7-tetrahydro-1H-pyrazolo[3,4-c]pyridine.

6. 1 - (6 - fluoro-phenyl)-3-amino-6-(4-methyl-phenyl)-7-oxo-4,5,6,7-tetrahydro-1H-pyrazolo[3,4-c]pyridine.

7. 1-(4-fluoro-phenyl)-3-(2-diethylamino-ethylamino)-6 - (4 - methyl - phenyl) - 7 - oxo-4,5,6,7-tetrahydro-1H-pyrazolo[3,4-c]pyridine.

References Cited

UNITED STATES PATENTS 3,250,769   5/1966   Schmidt et al. _____ 260—247.1

HENRY R. JILES, *Primary Examiner.*

A. L. ROTMAN, *Assistant Examiner.*

U.S. Cl. X.R.

260—295, 293, 294.7, 247.2, 268, 293.4, 239, 310, 294.8, 347.1, 243, 999

PO-1050
(5/69)

UNITED STATES PATENT OFFICE
CERTIFICATE OF CORRECTION

Patent No. 3,423,414  Dated January 21, 1969

Inventor(s) Herbert Morton Blatter

It is certified that error appears in the above-identified patent and that said Letters Patent are hereby corrected as shown below:

Column 12, line 2, "$R_2$" should be --- $R_3$ ---.

SIGNED AND SEALED
NOV 3 1970

(SEAL)
Attest:

Edward M. Fletcher, Jr.
Attesting Officer

WILLIAM E. SCHUYLER, JR.
Commissioner of Patents